Oct. 22, 1940.                I. B. NEWBERY                 2,218,922
                    VAPORIZER FOR COMBUSTION ENGINES
                        Filed June 29, 1938        2 Sheets-Sheet 1
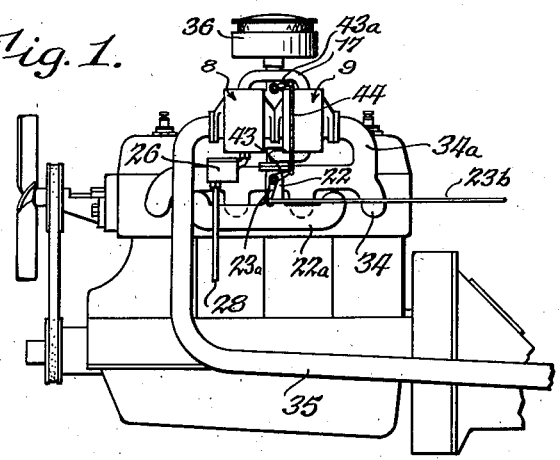
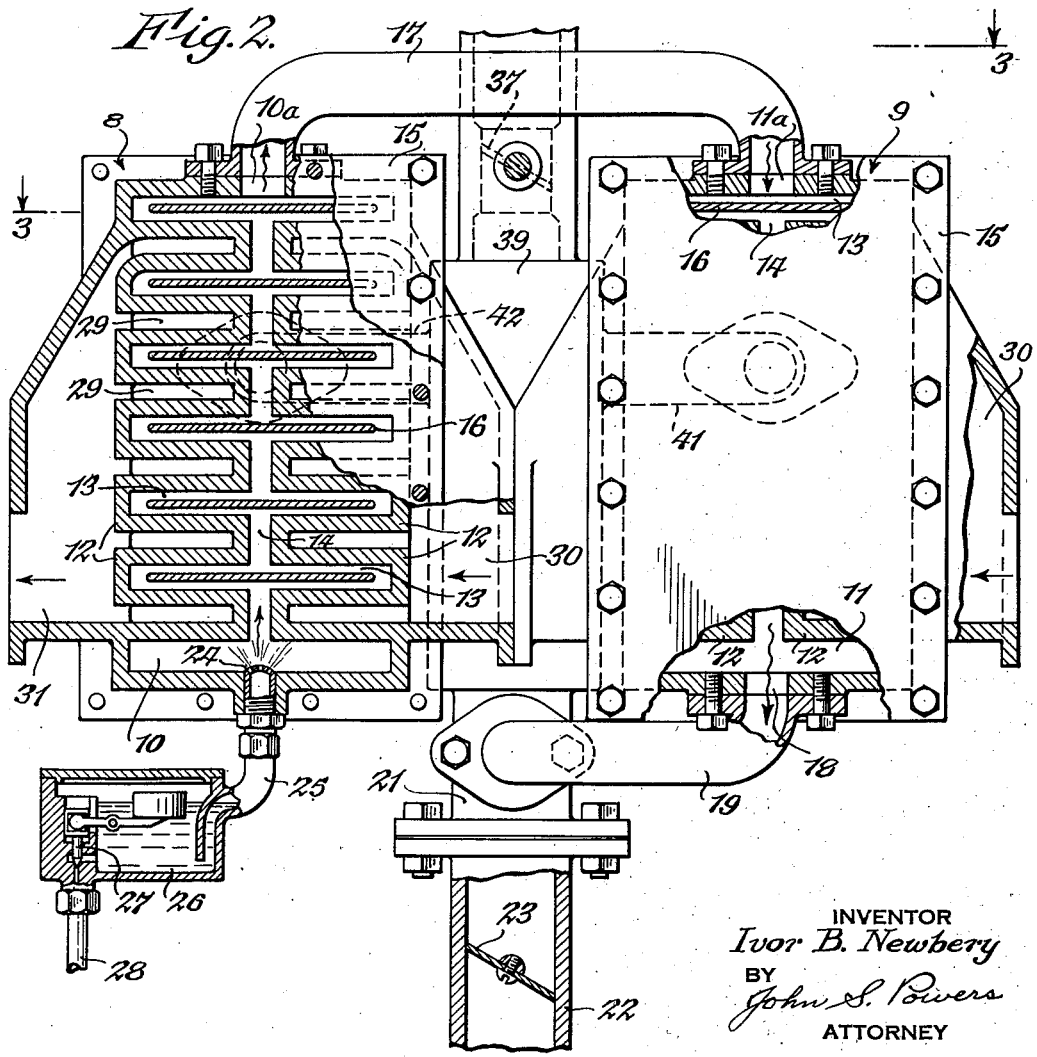
INVENTOR
*Ivor B. Newbery*
BY
*John S. Powers*
ATTORNEY Oct. 22, 1940.  I. B. NEWBERY  2,218,922
VAPORIZER FOR COMBUSTION ENGINES
Filed June 29, 1938    2 Sheets-Sheet 2
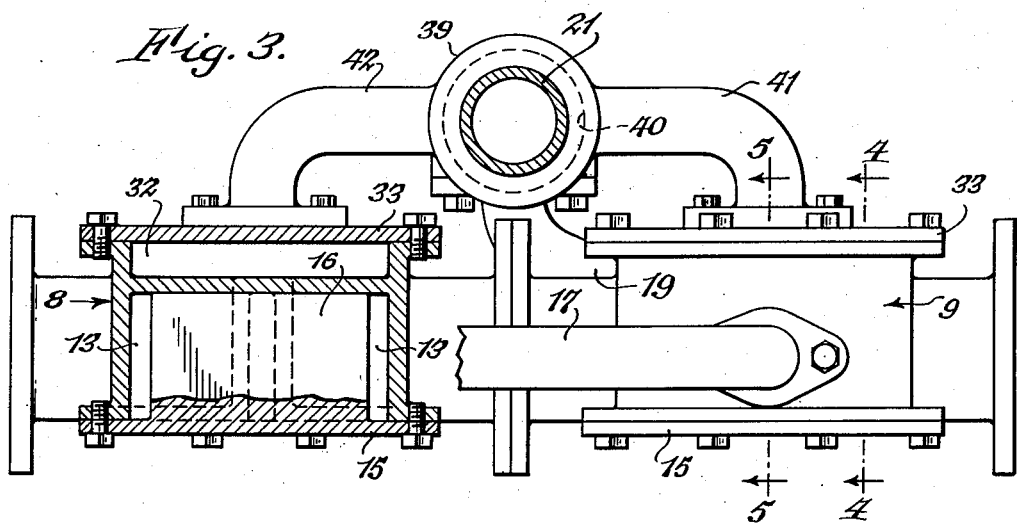
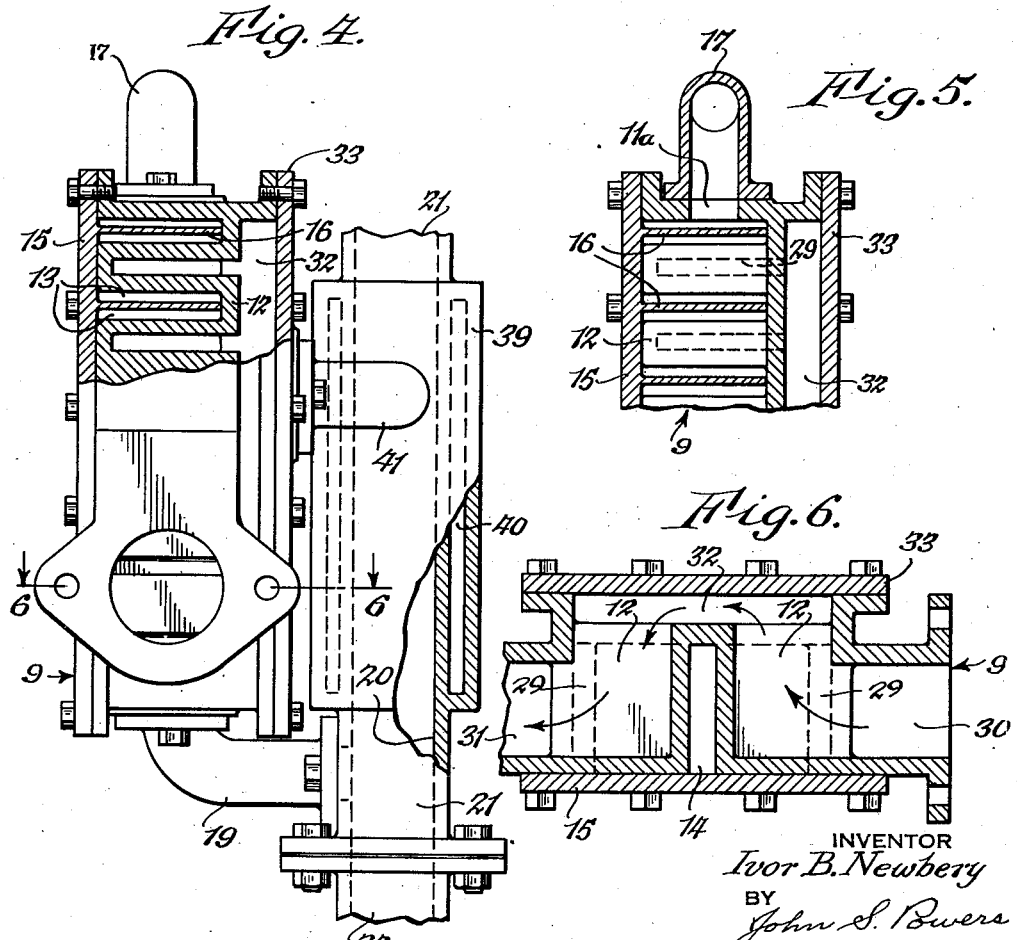
INVENTOR
Ivor B. Newbery
BY
John S. Powers
ATTORNEY Patented Oct. 22, 1940

2,218,922

UNITED STATES PATENT OFFICE 2,218,922

VAPORIZER FOR COMBUSTION ENGINES

Ivor B. Newbery, Buffalo, N. Y., assignor to Universal Research Corporation, Kenmore, N. Y., a corporation of New York Application June 29, 1938, Serial No. 216,546

5 Claims. (Cl. 48—107)

This invention relates to fuel vaporizing devices for combustion engines and more particularly is concerned with improvements in devices of the kind wherein provision is made for utilizing the exhaust gases of the engines as a heating medium to aid in the vaporization of the fuel.

One object of the invention is to provide a device which will condition the fuel in such a manner that its potential energy may be fully utilized, thereby insuring better engine performance and a saving in fuel consumption and preventing the formation of carbon in the cylinders of the engine and the production of carbon monoxide and other objectionable gases.

A further object is to provide a device which is so designed that the fuel is delivered to the cylinders of the engine in a highly vaporized, dry and expanded state, this object contemplating a device which is available as a muffler and in which the vaporization and expansion of the liquid components are effected at sub-atmospheric pressures and prior to their mixture with the air component.

A still further object is to provide a device which will condition the components of the fuel in such a manner that they may be uniformly and intimately mixed without the use of a carburetor.

A still further object is to provide a device which will enable the use of various inferior and inexpensive grades of fuel.

The invention is illustrated in the accompanying drawings, in which—

Figure 1 is a view in elevation of the device as applied to the engine of a motor vehicle;

Figure 2 is an enlarged view of the device, partially in elevation and partially in section;

Figure 3 is a section taken along line 3—3 of Figure 2;

Figure 4 is a section taken along line 4—4 of Figure 3;

Figure 5 is a fragmentary section taken along line 5—5 of Figure 3; and

Figure 6 is a section taken along line 6—6 of Figure 4.

The device, as illustrated, includes similar casings 8 and 9 which are secured together as a unit and which are formed to provide vaporizing chambers 10 and 11, respectively, it being understood that the number of casings may be varied. Two series of ribs 12 are formed in each of the vaporizing chambers, the ribs of each series being spaced from one another to provide branch passages 13 and being spaced from the ribs of the adjacent series to provide main passages 14 with which the said branch passages communicate.

The vaporizing chambers are closed by cover plates 15. The latter carry baffles 16 which are supported in the spaces between the ribs 12, the said baffles extending across the main passages 14 and into, but short of the ends of, the branch passages 13 to provide tortuous paths. The outlet 10a of the chamber 10 is connected by a conduit 17 with the inlet 11a of the chamber 11, the outlet 18 of the latter chamber being connected by a conduit 19 with a mixing chamber 20 which is located at the lower end of a pipe 21. The said pipe is connected to an extension 22 of the intake manifold 22a of the engine. A valve 23 is arranged in the said extension and is connected by a lever 23a (Figure 1) and rod 23b to a conventional throttle (not shown).

The gasoline or other fuel is introduced into the vaporizing chamber 10 through a nozzle 24. The latter is connected by a pipe 25 with a reservoir 26 in which a predetermined amount of the fuel is maintained by a float controlled valve 27, the fuel being supplied to the reservoir through a pipe 28.

In accordance with the invention the ribs 12 are hollow, each being formed to provide a cell 29. The cells in one series of ribs open at one side into an inlet chamber 30 while the cells of the companion series open at one side into an outlet chamber 31, the cells of both series of ribs opening at their backs into a connecting chamber 32 which is located behind the ribs and which is closed by a cover plate 33. The casings 8 and 9 are arranged end-to-end so that the outlet chamber of the latter communicates with the inlet chamber of the former, the gases from the exhaust manifold 34 being introduced into the inlet chamber of the casing 9 through an extension 34a. The exhaust gases, therefore, enter the series of cells at the right side of the said casing. They pass through the said cells into the connecting chamber at the rear and then enter the cells in the companion series of cells at the left side of the casing. The gases then enter the inlet chamber of the casing 8. They pass successively through the two series of cells in the said casing and enter an exhaust pipe 35 as they leave the outlet chamber 31, the path traversed by the exhaust gases being clearly indicated by the arrows in Figure 6. As the said gases pass through the casings 8 and 9 in the manner described their speed is reduced to such a degree that a muffler or other silencing device is rendered unnecessary.

It will be apparent that when the engine is operating at a normal temperature the gasoline or other fuel introduced into the chamber 10 will be immediately vaporized by contact with the hot walls of the ribs 12. The vapors thus produced are divided into two streams one of which is caused to enter each of the branch passages at one side of the casing and the other of which is caused to enter each of the branch passages at the opposite side of the casing. The two vapor streams merge as they pass around the final baffle and enter the conduit 17 but are again divided and heated in a similar manner as they flow through the casing 9. Each of the vapor streams is constantly in contact with the highly heated walls of the ribs 12. In their passage through the casings 8 and 9, therefore, the vapors are heated to such a degree that a dry highly vaporized gas is produced. In this connection it will be noted that the vaporizing chambers are maintained under a vacuum and that vaporization is effected in the absence of air. Conversion of the liquid into highly expanded vapors is thus insured. The flow of the exhaust gases through the casings 8 and 9 is counter to that of the vapors. The latter, therefore, are heated in stages and are introduced into the mixing chamber 20 when at their highest temperature.

The air which is mixed with the fuel vapors enters the pipe 21 after passing through a conventional filter 36, the amount of air entering the said pipe being regulated by a valve 37. The invention contemplates the heating of the air prior to its entry into the mixing chamber 20. To this end a jacket 39 is formed or provided around the pipe 21. The said jacket provides a chamber 40 which communicates with the chamber 32 of the casing 9 through an inlet pipe 41 and with the corresponding chamber of the casing 8 through an outlet pipe 42. A portion of the exhaust gases is thus caused to pass through the chamber 40 to heat the air as it passes through the conduit 21 on its way to the mixing chamber, the valve 37 being connected to the valve 23 by arms 43 and 43a and a link 44 so that the volume of air admitted to the mixing chamber is increased proportionately as the volume of vapors is increased. As the fuel vapors and air are both heated to a high temperature and are in a highly expanded state when they enter the mixing chamber they readily unite to provide a uniform mixture, the use of a carburetor or similar device for this purpose being unnecessary.

From the foregoing it will be apparent that the components of the fuel mixture are separately heated prior to their entry into the mixing chamber 20. As the vapors which are produced are dry and highly expanded complete combustion is insured. The potential energy represented by the said vapors may thus be fully utilized, thereby insuring better engine performance and a saving in fuel consumption. At the same time the formation of carbon in the combustion chambers and the production of carbon monoxide and other objectionable exhaust gases are prevented. The device has the further advantage that, owing to the high temperature to which the fuel is heated prior to its admission into the combustion chambers, various inferior and inexpensive grades may be employed with satisfactory results.

I claim as my invention:

1. A device of the character described including a casing, a vaporizing chamber in said casing which is connected to the intake manifold of a combustion engine and into which a liquid fuel is introduced, an inlet chamber at one side of said vaporizing chamber into which exhaust gases from said engine are introduced, an outlet chamber at the opposite side of said vaporizing chamber into which said exhaust gases are discharged, a plurality of substantially parallel series of ribs which define tortuous paths through said vaporizing chamber and which are formed to provide cells, the cells of one of said series of ribs communicating directly with said inlet chamber while the cells of a second of said series of ribs communicate directly with said outlet chamber, a connecting chamber with which the cells of both of said series of ribs communicate, said inlet chamber, outlet chamber and connecting chamber providing a path for the exhaust gases which extends transversely with respect to said series of ribs, a mixing chamber to which the vapors produced in said vaporizing chamber are conducted and means for introducing air into said last named chamber to provide a fuel mixture having the proper proportions of each component.

2. A device of the character described including a vaporizing chamber which is connected to the intake manifold of a combustion engine and into which a liquid fuel is introduced, a plurality of substantially parallel series of hollow ribs, the ribs of each series being spaced from one another and from the ribs of an adjacent series to provide main and branch passages, baffles which are arranged in said passages and which provide two tortuous paths, means for causing exhaust gases from said engine to simultaneously enter all of the ribs of one of said series and thereafter to simultaneously enter all of the ribs of the adjacent series, whereby to heat the walls of said passages to convert said fuel into vapors, said baffles causing one part of the vapors to traverse one of said paths and a second part to traverse the second of said paths, a mixing chamber to which the vapors thus produced are conducted and means for introducing air into said last named chamber to provide a fuel mixture having the proper proportions of each component.

3. A device of the character described including a casing, a vaporizing chamber in said casing which is connected to the intake manifold of a combustion engine and into which a liquid fuel is introduced, a cover plate for said vaporizing chamber, a plurality of substantially parallel series of hollow ribs, the ribs of each series being spaced from one another and from the ribs of an adjacent series to provide main and branch passages, baffles carried by said cover plate, said baffles being supported in said passages and providing tortuous paths, means for causing exhaust gases from said engine to simultaneously enter all of the ribs of one of said series and thereafter to enter all of the ribs of an adjacent series, whereby to heat the walls of said passages to convert said fuel into vapors, a mixing chamber to which the vapors thus produced are conducted and means for introducing air into said last named chamber to provide a fuel mixture having the proper proportions of each component.

4. A device of the character described including a casing, a vaporizing chamber in said casing which is connected to the intake manifold of a combustion engine and into which a liquid fuel is introduced, a cover plate for said vaporizing chamber, a plurality of substantially parallel series of hollow ribs, the ribs of each series being spaced from one another and from the ribs of an adjacent series to provide main and branch passages, baffles carried by said cover plate, said baffles being supported in said passages and providing two tortuous paths, means for causing exhaust gases from said engine to simultaneously enter all of the ribs of one of said series and thereafter to enter all of the ribs of an adjacent series, whereby to heat the walls of said passages to convert said fuel into vapors, said baffles causing one part of the vapors to traverse one of said paths and a second part to traverse the second of said paths, a mixing chamber to which the vapors thus produced are conducted and means for introducing air into said last named chamber to provide a fuel mixture having the proper proportions of each component.

5. A device of the character described including a casing, a vaporizing chamber in said casing which is connected to the intake manifold of a combustion engine and into which a liquid fuel is introduced, a cover plate for said vaporizing chamber, an inlet chamber at one side of said vaporizing chamber into which exhaust gases from said engine are introduced, an outlet chamber at the opposite side of said vaporizing chamber into which said exhaust gases are discharged, a plurality of substantially parallel series of ribs which are formed to provide cells, the ribs of each series being spaced from one another and from the ribs of an adjacent series to provide main and branch passages, the cells of one of said series of ribs communicating directly with said inlet chamber while the cells of the other of said series of ribs communicate directly with said outlet chamber, a connecting chamber with which the cells of both of said series of ribs communicate, whereby said exhaust gases are caused to flow first through the cells of one of said series of ribs and then through the cells of a second series of said said ribs to heat the walls of said passages, said inlet chamber, outlet chamber and connecting chamber providing a path for the exhaust gases which extends transversely with respect to said series of ribs, baffles carried by said cover plate, said baffles being supported in said passages and providing two tortuous paths, said baffles causing one part of the vapors which are produced to traverse one of said paths and a second part to traverse the other of said paths, a mixing chamber to which said vapors are conducted and means for introducing air into said last named chamber to provide a fuel mixture having the proper proportions of each component.

IVOR B. NEWBERY.